United States Patent
Davies (10) Patent No.: US 9,783,220 B2
(45) Date of Patent: Oct. 10, 2017

(54) STEERING COLUMN ASSEMBLY (71) Applicant: TRW Limited, Solihull West Midlands (GB)

(72) Inventor: Niclas Davies, Birmingham West Midlands (GB)

(73) Assignee: TRW Limited, Solihull West, Midlands (GB)

( * ) Notice: Subject to any disclaimer, the term of this patent is extended or adjusted under 35 U.S.C. 154(b) by 0 days.

(21) Appl. No.: 14/913,881

(22) PCT Filed: Aug. 28, 2014

(86) PCT No.: PCT/GB2014/052610
§ 371 (c)(1),
(2) Date: Feb. 23, 2016

(87) PCT Pub. No.: WO2015/028803
PCT Pub. Date: Mar. 5, 2015

(65) Prior Publication Data
US 2016/0200346 A1 Jul. 14, 2016

(30) Foreign Application Priority Data

Aug. 28, 2013 (GB) ..................... 1315293

(51) Int. Cl.
*B62D 1/184* (2006.01)
*B62D 1/19* (2006.01)

(52) U.S. Cl.
CPC ............. *B62D 1/184* (2013.01); *B62D 1/195* (2013.01)

(58) Field of Classification Search
CPC ........ B62D 1/184; B62D 1/185; B62D 1/187; B62D 1/192; B62D 1/195
See application file for complete search history.

(56) References Cited

U.S. PATENT DOCUMENTS 8,167,502 B2 * 5/2012 Davies ................ B62D 1/184
384/571
8,882,147 B2 11/2014 Schnitzer et al.
(Continued)

FOREIGN PATENT DOCUMENTS

WO 2011063891 A1 6/2011
WO 2012168689 A1 12/2012

OTHER PUBLICATIONS

Patent Acts 1977: Search Report under Section 17(5), Application No. GB1315293.9 dated Apr. 1, 2014.
(Continued)

*Primary Examiner* — Laura Freedman
(74) *Attorney, Agent, or Firm* — MacMillan, Sobanski & Todd, LLC (57) ABSTRACT

A steering column assembly comprises a shroud having a first part that is fixed in position axially relative to the vehicle and a second part that can in use can move relative to the first part for adjustment of the length of the shroud, a support bracket that in use is secured to a part of the vehicle, and a clamp mechanism that has a locked position in which it locks the position of the moving part of the shroud relative to the first part of the shroud and an unlocked position in which it permits movement between the first and second parts of the shroud. The assembly further comprises an end of travel protection mechanism which comprises a cam that is free to rotate around an axis and a lock bolt, in a locked position the end of travel protection mechanism urging the lock bolt into a position where it limits the amount of collapse of the shroud and in an unlocked position the end of travel protection mechanism the lock bolt being withdrawn into a position where it permits additional collapse of the shroud beyond that permitted when in the locked position, in which the mechanism converts a rotary movement of the cam into the required linear motion of the lock bolt, the (Continued)

Section A-A
Lever locked rotation of the cam in use being created by a linkage that is connected to a part of the clamp mechanism arranged such that with the clamp mechanism in the unlocked position the secondary lock mechanism is in the locked position and with the clamp mechanism in the locked position the secondary lock mechanism is in the unlocked position.

12 Claims, 5 Drawing Sheets

(56) References Cited

U.S. PATENT DOCUMENTS

| | | | |
|---|---|---|---|
| 9,145,162 B2 * | 9/2015 | Butler | B62D 1/184 |
| 2012/0125139 A1 | 5/2012 | Tinnin et al. | |
| 2012/0126522 A1 | 5/2012 | Tinnin et al. | |
| 2012/0285286 A1 * | 11/2012 | Schnitzer | B62D 1/195 |
| | | | 74/493 |

OTHER PUBLICATIONS

PCT International Search Report and the Written Opinion, Application No. PCT/GB2014/052610 filed Aug. 28, 2014, dated Dec. 18, 2014.

* cited by examiner

Section A-A
Lever locked

Figure 3

Section A-A
Lever unlocked
system blocked

STEERING COLUMN ASSEMBLY

CROSS-REFERENCE TO RELATED APPLICATIONS

This application is a national stage of International Application No. PCT/GB2014/052610, filed Aug. 28, 2014, the disclosures of which are incorporated herein by reference in entirety, and which claimed priority to Great Britain Patent Application No. 1315293.9, filed Aug. 28, 2013, the disclosures of which are incorporated herein by reference in entirety.

BACKGROUND OF THE INVENTION

This invention relates to improvements in steering column assemblies.

Steering column assemblies for automotive vehicles and the like are increasingly required to be adjustable for rake and, in many cases, reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises two tubes which slide one inside the other to permit reach adjustment. A fixing rail welded to one of the tubes is secured to a support bracket by the releasable clamp mechanism. Rake adjustment can be achieved by providing a support bracket which includes vertically extending slots through which the clamp mechanism passes. The clamp mechanism, which is secured to the fixing rail, can be moved vertically within these slots, taking the column with it to adjust rake.

A known arrangement for use in restricted spaces utilises a bracket in the form of an inverted U-shape having two arms depending from a base which have the vertical slots formed therein. The clamp mechanism includes a bolt which passes through the slots to link the arms together and the column is located between the arms.

The clamp mechanism typically comprises a cam mechanism that acts between a fixed part of a clamp pin and a part of one of the arms. The cam mechanism comprises a fixed cam part that is prevented from rotation by engagement of an anti-rotation feature in a slot in the arm and a rotating cam part that is typically secured to a locking lever. Both the fixed and rotating cam parts share a common axis with the bolt, the rotating cam part rotating about the axis of the bolt. The anti-rotation feature is shaped so that the fixed part cannot rotate in the slot but is free to move along the slot. For instance, it may comprise a rectangular block that protrudes from the fixed cam part away from its cam face (or cam follower), the side walls of the block fitting snugly between the side walls of the slot. Any attempt to rotate the fixed cam part will be constrained.

When locked, the shroud cannot collapse because it is clamped securely to the bracket. In some circumstances, such as a crash, it may be desirable that the shroud can collapse in a controlled manner. To achieve this it is known to fix the bracket to the vehicle using one or more frangible fasteners and to provide for an energy absorbing member which acts between the shroud or bracket and a fixed part of the vehicle when they are locked. If a crash force is applied that is sufficient to snap the couplings, the whole shroud and bracket can collapse and the collapse energy is controlled by deformation of the energy absorbing member. Other energy absorbing arrangements are known, a common trait being that they only come into play once the shroud has first been collapsed during a crash.

Whilst such designs provide increases in safety, it is also a known problem that the frangible connectors or the energy absorbing member or other arrangements could become damaged if a high force is applied to them when the clamp assembly is unlocked and being adjusted. For instance, if a driver forcefully moves the shroud to a collapsed position during adjustment, and the moveable shroud reaches the end of its travel, further movement will be resisted by the bracket. This provides a force path through to the frangible connectors the same as if the vehicle was in a crash and the frangible connectors could become damaged. The energy absorbing member may in turn also become damaged. If it springs back when the force is released the damage could go unnoticed, and the steering would perhaps not function as intended in a real crash.

BRIEF SUMMARY OF THE INVENTION

According to a first aspect the invention provides a steering column assembly comprising a shroud having a first part that is fixed in position axially relative to the vehicle and a second part that can in use can move relative to the first part for adjustment of the length of the shroud, a support bracket that in use is secured to a part of the vehicle, and a clamp mechanism that has a locked position in which it locks the position of the moving part of the shroud relative to the first part of the shroud and an unlocked position in which it permits movement between the first and second parts of the shroud, the clamp mechanism including a locking lever that is operable by a user to move the clamp mechanism between the locked and unlocked positions, characterised in that the assembly further comprises an end of travel protection mechanism which comprises a cam that is free to rotate around an axis and a lock bolt, in a locked position the end of travel protection mechanism urging the lock bolt into a position where it limits the amount of collapse of the shroud and in an unlocked position the end of travel protection mechanism the lock bolt being withdrawn into a position where it permits additional collapse of the shroud beyond that permitted when in the locked position, in which the mechanism converts a rotary movement of the cam into the required linear motion of the lock bolt, the rotation of the cam in use being created by a linkage that is connected to a part of the clamp mechanism arranged such that with the clamp mechanism in the unlocked position the secondary lock mechanism is in the locked position and with the clamp mechanism in the locked position the secondary lock mechanism is in the unlocked position.

In the locked position the lock bolt may engage with a part of the fixed portion of the shroud and in the unlocked position the lock bolt may be held clear of that part of the shroud.

The clamp mechanism and end of travel protection mechanism may be synchronised so that they work in perfect anti-phase, or slightly out of phase or perhaps with some hysteresis, the act of locking of one resulting in simultaneous unlocking of the other or one locking or unlocking slightly before the other unlocks or locks.

The lock bolt of the end of travel protection mechanism may engage a portion of the fixed shroud comprising an opening such as a bore or hole or slot provided in the fixed shroud portion when in the locked position, moving clear of the bore of slot when unlocked.

The slot may have a first end which is located so that the bolt strikes the first end when the moving shroud part reaches an end of its permitted travel during adjustment, the bolt being moved to a position in which it does not strike the first end when the mechanism is in a locked position.

Alternatively, the lock bolt may strike an end of the fixed shroud portion when the shroud reaches an allowable end of travel during adjustment.

The cam and lock bolt may be formed as a single part, or the lock bolt may be separate from the cam.

In one convenient arrangement one or more protrusions are mounted on the moving shroud which form a first cam surface, the protrusions being spaced around a bore formed in the moving shroud, and the cam comprises a cap having a head which defines a moving cam surface that engages the first cam surface, the cap including a central stem that extends away from the head of the cap into the bore, the two cam surfaces being shaped so that as the cap is rotated the stem moves axially within the bore to produce the required reciprocal motion of the lock bolt.

The protrusions may define a wall which may be continuous, extending fully around the bore. The protrusions may be plastic with a low coefficient of friction or a smooth low friction coating may be provided.

The lock bolt may comprise an end part of the stem of the cap such that the cap and lock bolt together are generally mushroom shaped. The stem of the cap may therefore function as the lock bolt.

The stem should of course be long enough to extend through the bore in the moving shroud and into the slot in the fixed shroud.

The end of travel protection mechanism may include a spring that urges the bolt towards the slot. This may comprise a coil spring that acts between a part of the lock bolt and the moving shroud. The stem of the cap may extend axially through the spring to engage the lock bolt or may form the lock bolt.

The spring may also function to bias the two cam surfaces together, for example to bias the cap onto the protrusions surrounding the bore.

The stem, where provided, may have at least one shoulder formed along its length against which the spring acts. The shoulder may form one wall of a groove, and a circlip may be located in the groove, the spring acting against the circlip.

The linkage may comprise a first part secured to a part of the clamp mechanism that moves as the clamp mechanism is locked and unlocked and a second part secured to the cam.

For example. the first or second part may comprise a crank sliding arm such as a link rod that is secured to the clamp mechanism of the cam, and the second part may comprise a guide, such as a guide rail or guide tube, secured to the other of the clamp mechanism and cam, the arm sliding relative to the guide as the clamp mechanism is locked and unlocked.

The linkage may be connected to the locking lever of the clamp mechanism, or to a crank which moves as the clamp mechanism is locked and unlocked.

The linkage should be adapted to accommodate the axial movement of the cam as it moves from the locked to unlocked positions. For instance, the rod may be flexible to accommodate this movement. If this is not allowed for, the mechanism might otherwise jam. In one arrangement, the cam may comprise two camsets that work in opposite directions and are timed so that they have matching axial motion.

The guide may comprise a closed bore or partially open bore tube, with the arm being slidingly received in the tube.

Thus, as the lever or crank of the clamp mechanism rotates the arm will move, sliding in the guide and causing the cam of the secondary locking mechanism to rotate, in turn producing reciprocal movement of the cam follower.

The tube may be integrally formed with the cam, for instance by making the cam and tube as a single molded or cast part.

The end of travel protection mechanism may be fixed to the second part of the shroud so that the cam mechanism moves relative to the clamp mechanism as the shroud is telescopically adjusted, the linkage being arranged to permit this movement by sliding relative to the cam.

The rotating cam and cam surface may rotate about an axis that lies in a plane that is generally orthogonal to a plane that contains the path along which the shroud may adjust telescopically.

Other advantages of this invention will become apparent to those skilled in the art from the following detailed description of the preferred embodiments, when read in light of the accompanying drawings.

DETAILED DESCRIPTION OF THE INVENTION

Figure 1A:
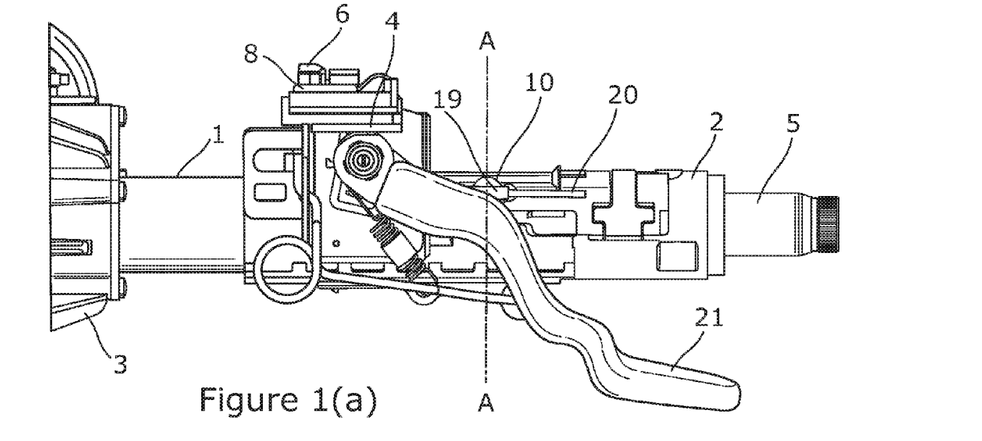
FIG. 1 is view in elevation from the side of an embodiment of a steering column assembly for a vehicle according to the present invention when the clamp mechanism is in the locked position and the end of travel prevention mechanism is in the unlocked position.
Figure 2:
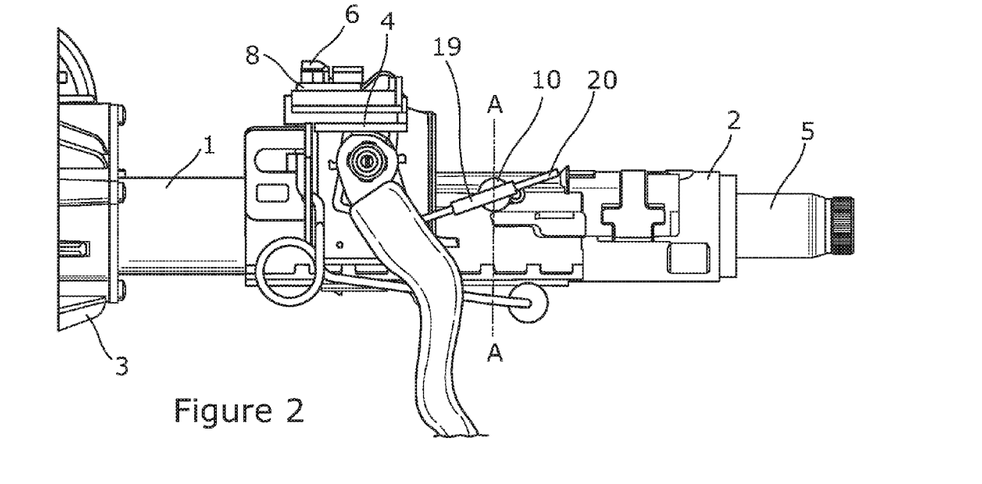
FIG. 2 is a view in elevation from the side of an embodiment of a steering column assembly for a vehicle according to the present invention when the clamp mechanism is in the unlocked position and the end of travel prevention mechanism is in the locked position.

As shown in FIG. 1, a steering column assembly comprises a steering column shroud 1, 2 that extends from a gearbox housing 3 that is fixed at a pivot point to a part of the vehicle body and also releasably fixed to a support bracket 4 which is secured to the vehicle, typically by welding or bolting it to a region under the dashboard at a point somewhere between the pivot and the steering wheel. The shroud comprises a fixed part 1 and a moving part 2 which slides telescopically over the fixed part 1. The invention could also apply to an arrangement in which the moving part slides telescopically into the fixed part, as so called "inverted tube in tube assembly". The shroud surrounds a supports a steering column shaft 5 that can be fixed to a steering wheel (not shown). The skilled person will understand that the invention also applies to so called "inverted tube in tube" assemblies in which the moving part 2 will slide over the fixed part rather than inside it.

The shroud 1, 2 is fixed to the bracket 4 by a clamp mechanism. The clamp mechanism can be unlocked and locked to allow the rake of the steering column shroud to be adjusted by pivoting about the pivot point. When locked the steering column shroud cannot easily be moved.

The bracket 4 is in the form of a metal sheet pressed into an inverted U-shape, or a casting of U-shape, with the base of the U lying in a generally horizontal plane above the steering column shroud. The two dependent arms (only one visible in FIG. 1) of the U-shaped bracket extend generally downwards in a vertical plane and extend down either side of a fixing rail (not shown) secured to the moving part 2 of the steering column shroud. A clamp mechanism acts between the two arms to squeeze them together so that they clamp onto the sides of the fixing rail when the clamp mechanism is in its locked position, thereby holding the shroud in position. The bracket is secured to the vehicle structure using bolts (not shown) that pass through openings 7 in the bracket 4. Each bolt is secured to a frangible connector 8 that allows the bracket, and part of the connector 8 to shear away from the bolts in an accident.

The clamp mechanism comprises a shaft such as a bolt or pin which passes through a respective generally vertical slot in each arm and generally horizontal slots (not shown) in each side of the fixing rail. The size and shape and location of these slots determines the range of movement that is possible for the steering column shroud. A head located in a component that is wider than the opening (not shown) is provided on one end of the shaft, which has an outer dimension greater than the width of the slot in the adjacent arm so that it cannot pass through the opening. Threaded onto the other end of the shaft is an adjustable nut, and between that nut and the outside of the outer leaf of the adjacent arm is a cam assembly. The cam assembly comprises a fixed cam mounted to the shroud part 2 and a moving cam which can be rotated relative to the fixed cam by a locking lever. Rotation of the moving cam varies the length of the cam assembly.

In the unlocked position of the clamp assembly, the cam assembly has its shortest length so that the bracket arms are not clamped to the fixed rail. In the locked position, the cam assembly has its longest length. The cam therefore pushes the arms of the bracket together onto the fixed rail. As this occurs, the force applied by the cam mechanism is opposed by the amount of "spring" in the arms of the bracket which resist being bent onto the fixed rail.

Other clamp mechanisms could be used, and the skilled person will understand that the invention should not be limited to any particular form of clamp mechanism.

The two part shroud 1, 2 and steering column shaft 5 allow the steering wheel to be adjusted for reach. As the moving part of the shroud 2 is telescoped into (or onto) the fixed shroud part 1 the horizontal slot moves along the pin. In addition, the whole shroud can be adjusted for rake with the pin moving along the vertical slots.

The connection of the bracket to the vehicle body is through the two frangible connectors which are designed to shear away if an excessive load is applied to them. This will happen if the second shroud portion is moved with great force beyond its normal reach position, the end of the horizontal slot striking the clamp bolt, and then under the force of the shroud acting on the bolt through that slot the bolt in turn forces the bracket to shear the capsules.

To control movement of the shroud and bracket an energy absorbing member (not shown) is typically provided which acts between the bracket and the vehicle body. As the bracket moves with the shroud, the energy absorbing member deforms in a controlled way and in doing so absorbs the energy of the moving shroud and bracket.

To prevent damage to the capsules 8 and energy absorbing member during adjustment of the shroud 1, 2, it is important to ensure the end of the horizontal slot that the bolt passes through cannot be forced onto the bolt. This is achieved in the embodiment shown by providing a secondary locking mechanism or end of travel protection mechanism 9 that acts between the moving part of the shroud and the fixed part of the shroud when the clamp mechanism is unlocked. When the clamp mechanism is locked that secondary locking mechanism is unlocked allowing the full crash protection to be achieved if needed. The mechanism can be seen in FIGS. 1 to 6.

Figure 3:
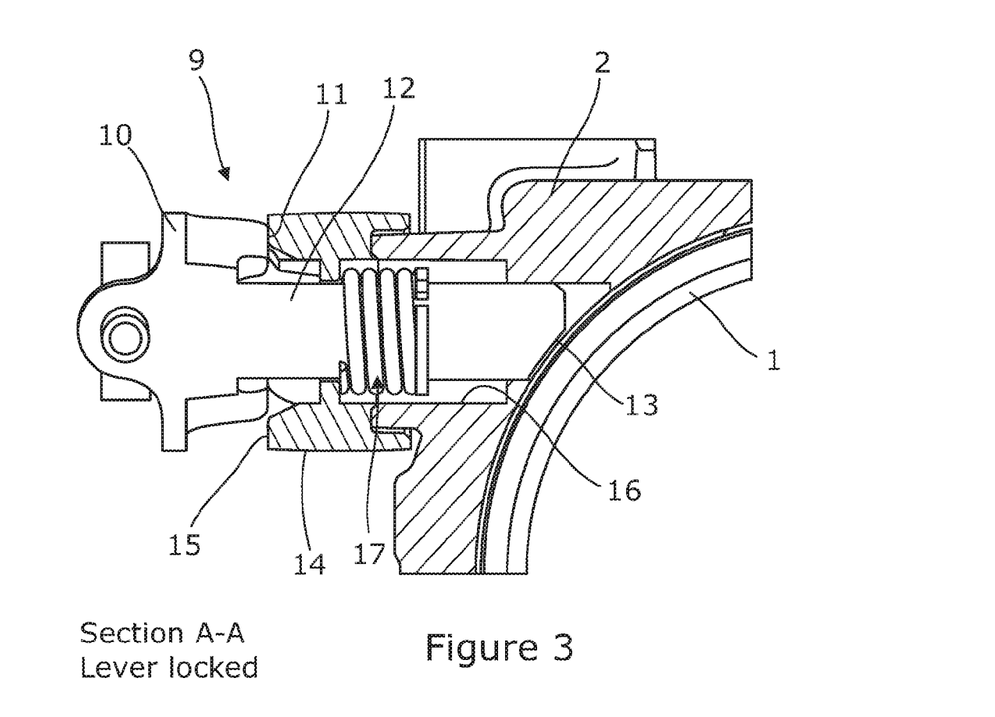
FIG. 3 is a cross section view along Section line A-A in FIG. 1 of the end of travel protection mechanism with the clamp mechanism locked.
Figure 4:
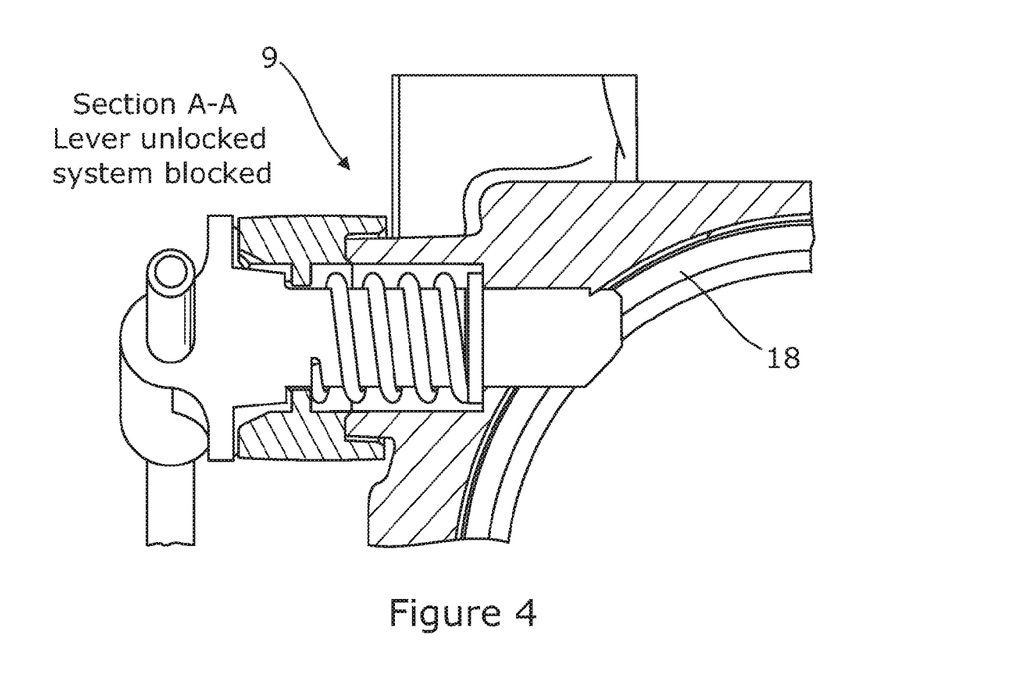
FIG. 4 is a cross section view alone section line A-A of FIG. 2 showing the end of travel protection mechanism of the steering assembly with the clamp assembly unlocked.

The secondary locking mechanism 9 comprises a cam that is free to rotate around an axis that is generally perpendicular to the long axis of the shroud. The cam comprises a cap 10 that has a first cam surface 11 formed on one face. This surface in this example comprises two protrusions located on axially opposed regions of the face, each protrusion defining a smooth ramped surface. Of course, more than two protrusions could be provided, and the invention should not be limited to any particular cam profile. A central stem 12 extends away from the cap 10 to form a lock bolt or pin 13 at its end furthest from the cap 10. The stem has a uniform diameter at each end but is stepped down to a reduced diameter midway between the ends. The cap 10 sits on wall 14 that surrounds a bore 16 in the moving shroud part 2, between the clamp mechanism and the steering wheel. The wall 14 is also shaped to form a second cam surface 15 that the cam surface 11 of the cap will run along as the cap rotates. This also has two protrusions either side of the bore 16 which form smooth ramps over which the ramps of the cap can slide. The two cam surfaces cooperate so that as the cap rotates, it causes the stem and lock bolt 13 to move axially within the bore 16 in the shroud.

A spring 17 is provided which acts between the shroud and the central reduced diameter part of the stem to bias the cap 10 into engagement with the wall. The spring 17 comprises a coil spring that fits around the stem.

In a locked position the cap 10 is in a rotary position such that lock bolt 13 formed by the end of the stem is urged against the force of the spring 17 into engagement with a slot 18 in the fixed portion 1 of the shroud and in an unlocked position the cap 10 is in a different rotary position where it pulls the bolt clear of the slot. The engagement of the bolt in the slot provides a limit on the telescopic movement of the moving shroud part, and by careful selection of the size and shape of the slot and relative position of the bolt this limit can be set so that it provides protection against damage to the frangible connectors and energy absorbing members.

The bolt 13 is moved between the locked and unlocked positions by rotation of the cap which is produced by a sliding linkage 19, 20 that connects the cap to the locking lever 21 of the clamp mechanism. With the clamp mechanism in the unlocked position the secondary lock mechanism is in the locked position and with the clamp mechanism in the locked position the secondary lock mechanism is in the unlocked position.

Figure 5:
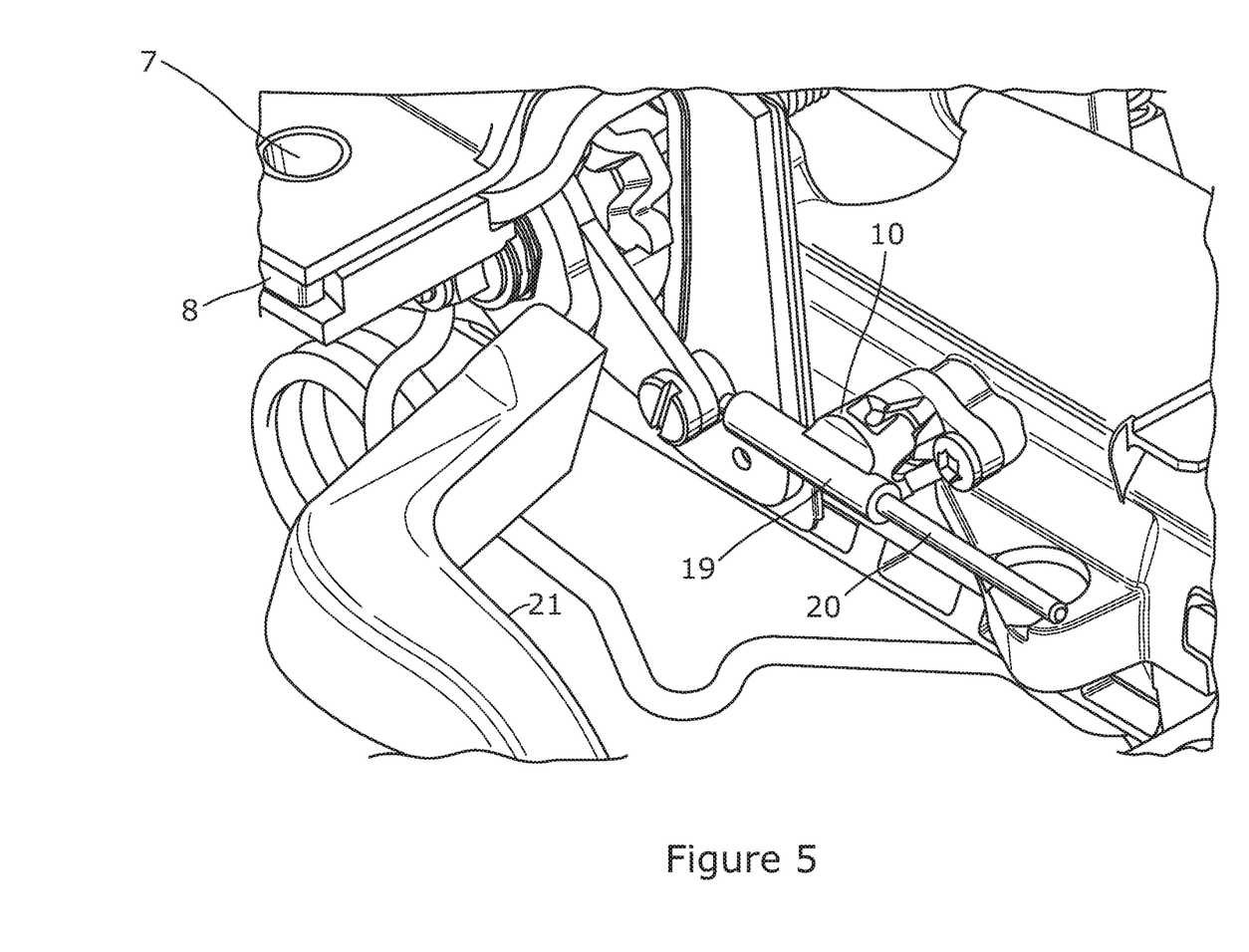
FIG. 5 is an enlarged perspective view of the assembly of FIG. 1 when the end of travel prevention mechanism is in the locked position.
Figure 6:
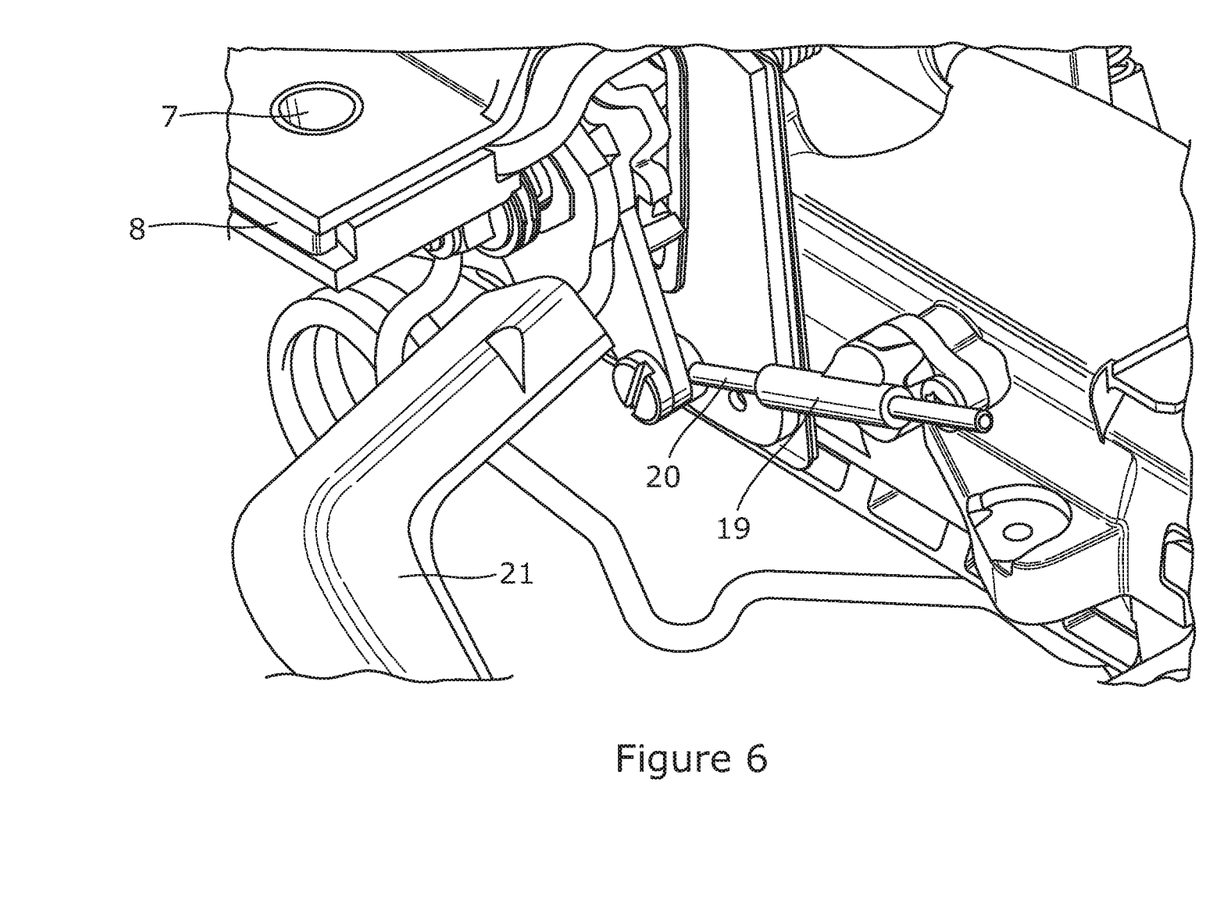
FIG. 6 is a corresponding perspective view of the assembly of FIG. 2 when the end of travel prevention mechanism is in the unlocked position.

The sliding linkage comprises a link rod 20 that is secured at one end to the lever through a pin or rivet or bolt. A portion of the link rod 20 then slides within a guide rail secured to the cap.

The guide rail 19 comprises a tube which has an axis that extends in a direction orthogonal to the axis of the stem 12, with the link rod 20 being slidingly received in the tube. Thus, as the lever 21 rotates the link rod 20 will move axially in the tube but will rotate about a pivot point corresponding to the axis of rotation of the cap 10, sliding in the tube and causing the cam of the secondary locking mechanism to rotate, in turn producing reciprocal movement of the bolt.

Because the moving shroud moves relative to the fixed shroud, the link rod 20 should be sufficiently long to ensure it remains in the tube 19 when the shroud is fully extended. Also, it should be noted that as the shroud is moved during adjustment some rotation of the cam of the secondary lock mechanism will occur. However, this will not affect the performance of the secondary lock mechanism.

Figure 7:
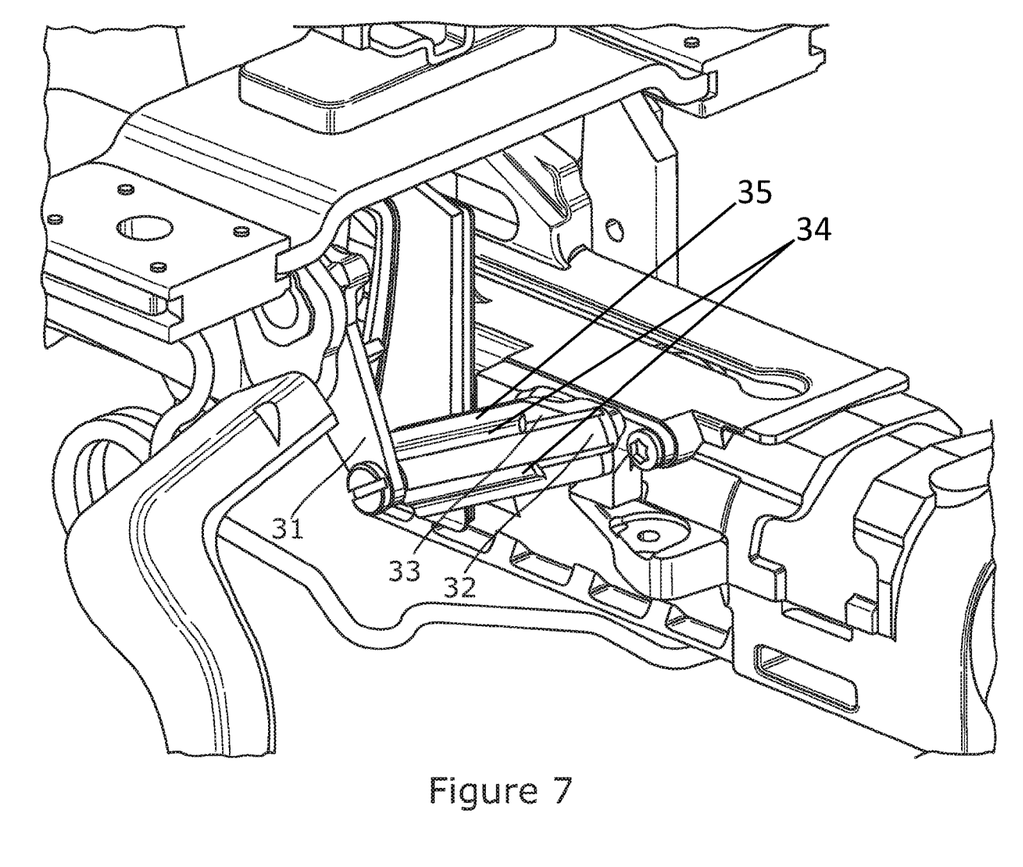
FIG. 7 shows an alternative arrangement of the end of travel protection mechanism.

An alternative end of travel protection mechanism is shown in FIG. 7. In this arrangement the link rod 32 is not connected to the lever but is instead connected to a separate crank arm 31. The link rod 30 does not slide in a tube but slides within a slot formed between two rails 34 in a molding 33 integrated with the cap 35. Apart from this change, the parts of the end of travel protection mechanism are generally the same as those of the first embodiment.

The end of travel protection mechanism can be used with a variety of different designs of steering shroud, and to protect many different types of energy absorbing mechanism. The embodiment is provided for guidance only, and the scope of protection afforded to the invention should be derived from the accompanying drawings.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
a shroud having a first part that is fixed in position axially relative to a vehicle and a second part that is configured in use to move relative to the first part for adjustment of a length of the shroud,
a support bracket that in use is secured to a part of the vehicle, and
a clamp mechanism that has a locked position in which the clamp mechanism locks the position of the second part of the shroud relative to the first part of the shroud and an unlocked position in which the clamp mechanism permits movement between the first and second parts of the shroud, the clamp mechanism including a locking lever that is operable by a user to move the clamp mechanism between the locked and unlocked positions,
wherein the assembly further comprises an end of travel protection mechanism which comprises a cam that is free to rotate around an axis and a lock bolt, in a locked position of the end of travel protection mechanism, the end of travel protection mechanism urging the lock bolt into a position where the lock bolt limits the amount of collapse of the shroud and in an unlocked position of the end of travel protection mechanism the lock bolt being withdrawn into a position where the lock bolt permits additional collapse of the shroud beyond that permitted when in the locked position, in which the end of travel protection mechanism converts a rotary movement of the cam into a linear motion of the lock bolt, the rotation of the cam in use being created by a linkage that is connected to a part of the clamp mechanism arranged such that with the clamp mechanism in the unlocked position the end of travel protection mechanism is in the locked position and with the clamp mechanism in the locked position the end of travel protection mechanism is in the unlocked position, in which the linkage comprises a first part secured to a part of the clamp mechanism that moves as the clamp mechanism is locked and unlocked and a second part, which is formed separate and distinct from the first part, secured to the cam of the end of travel protection mechanism.

2. The steering column assembly according to claim 1 in which in the locked position of the end of travel protection mechanism the lock bolt engages with a part of the first part of the shroud and in the unlocked position of the end of travel protection mechanism the lock bolt is held clear of the first part of the shroud.

3. The steering column assembly according to claim 1 in which the cam and lock bolt of the end of travel protection mechanism are formed as a single part.

4. The steering column assembly according to claim 1 in which one or more protrusions are mounted on the second part of the shroud which form a second cam surface, the protrusions being spaced around a bore formed in the second part of the shroud, and the cam comprises a cap having a head which defines a first cam surface that engages the second cam surface, the cap including a central stem that extends away from the head of the cap into the bore, the first cam surface and the second cam surface being shaped so that as the cap is rotated the stem moves axially within the bore to produce the linear motion of the lock bolt.

5. The steering column assembly according to claim 4 in which the lock bolt comprises an end part of the stem of the cap such that the cap and lock bolt together are generally mushroom shaped.

6. The steering column assembly according to claim 4 in which the end of travel protection mechanism includes a spring that urges the lock bolt towards a slot.

7. The steering column assembly according to claim 6 in which the spring also functions to bias the first cam surface and the second cam surface together.

8. The steering column assembly according to claim 1 in which the first part or second part comprises a crank sliding arm that is secured to the clamp mechanism or the cam, and the other of the first part or second part comprises a guide secured to the other of the clamp mechanism and cam, the arm sliding relative to the guide as the clamp mechanism is locked and unlocked.

9. The steering column assembly according to claim 1 in which the linkage is connected to the locking lever of the clamp mechanism, or to a crank which moves as the clamp mechanism is locked and unlocked.

10. The steering column assembly according to claim 1 in which the end of travel protection mechanism is fixed to the second part of the shroud so that the cam moves relative to the clamp mechanism as the shroud is telescopically adjusted, the linkage being arranged to permit this movement by sliding relative to the cam.

11. A steering column assembly comprising:
a shroud having a first part that is fixed in position axially relative to a vehicle and a second part that is configured in use to move relative to the first part for adjustment of a length of the shroud,
a support bracket that in use is secured to a part of the vehicle, and
a clamp mechanism that has a locked position in which the clamp mechanism locks the position of the second part of the shroud relative to the first part of the shroud and an unlocked position in which the clamp mechanism permits movement between the first and second parts of the shroud, the clamp mechanism including a locking lever that is operable by a user to move the clamp mechanism between the locked and unlocked positions, wherein the assembly further comprises an end of travel protection mechanism which comprises a cam that is free to rotate around an axis and a lock bolt, in a locked position of the end of travel protection mechanism, the end of travel protection mechanism urging the lock bolt into a position where the lock bolt limits the amount of collapse of the shroud and in an unlocked position of the end of travel protection mechanism the lock bolt being withdrawn into a position where the lock bolt permits additional collapse of the shroud beyond that permitted when in the locked position, in which the end of travel protection mechanism converts a rotary movement of the cam into a linear motion of the lock bolt, the rotation of the cam in use being created by a linkage that is connected to a part of the clamp mechanism arranged such that with the clamp mechanism in the unlocked position the end of travel protection mechanism is in the locked position and with the clamp mechanism in the locked position the end of travel protection mechanism is in the unlocked position, in which the cam and lock bolt of the end of travel protection mechanism are formed as a single part.

12. A steering column assembly comprising:

a shroud having a first part that is fixed in position axially relative to a vehicle and a second part that is configured in use to move relative to the first part for adjustment of a length of the shroud, a support bracket that in use is secured to a part of the vehicle, and a clamp mechanism that has a locked position in which the clamp mechanism locks the position of the second part of the shroud relative to the first part of the shroud and an unlocked position in which the clamp mechanism permits movement between the first and second parts of the shroud, the clamp mechanism including a locking lever that is operable by a user to move the clamp mechanism between the locked and unlocked positions, wherein the assembly further comprises an end of travel protection mechanism which comprises a cam that is free to rotate around an axis and a lock bolt, in a locked position of the end of travel protection mechanism, the end of travel protection mechanism urging the lock bolt into a position where the lock bolt limits the amount of collapse of the shroud and in an unlocked position of the end of travel protection mechanism the lock bolt being withdrawn into a position where the lock bolt permits additional collapse of the shroud beyond that permitted when in the locked position, in which the end of travel protection mechanism converts a rotary movement of the cam into a linear motion of the lock bolt, the rotation of the cam in use being created by a linkage that is connected to a part of the clamp mechanism arranged such that with the clamp mechanism in the unlocked position the end of travel protection mechanism is in the locked position and with the clamp mechanism in the locked position the end of travel protection mechanism is in the unlocked position, in which the end of travel protection mechanism is fixed to the second part of the shroud so that the cam moves relative to the clamp mechanism as the shroud is telescopically adjusted, the linkage being arranged to permit this movement by sliding relative to the cam.

* * * * *